United States Patent [19]

Chow

[11] 4,067,053

[45] Jan. 3, 1978

[54] ACTIVE SYMMETRICAL COMPONENT SEQUENCE FILTER

[75] Inventor: Kung C. Chow, Whippany, N.J.

[73] Assignee: Westinghouse Electric Corporation, Pittsburgh, Pa.

[21] Appl. No.: 692,695

[22] Filed: June 3, 1976

[51] Int. Cl.² .............................................. H02H 3/26
[52] U.S. Cl. ......................................... 361/76; 361/77
[58] Field of Search .......................... 317/47, 48, 27 R; 324/86, 108, 83 Q, 107; 307/127, 232

[56] References Cited

U.S. PATENT DOCUMENTS

| | | | |
|---|---|---|---|
| 2,854,632 | 9/1958 | Lode | 324/108 |
| 3,154,737 | 10/1964 | Hodges | 324/108 |
| 3,699,441 | 10/1972 | Linders | 324/82 X |
| 3,938,006 | 2/1976 | Gadwal et al. | 317/47 X |
| 3,947,728 | 3/1976 | Smith | 317/47 |

Primary Examiner—J D Miller
Assistant Examiner—Patrick R. Salce
Attorney, Agent, or Firm—S. A. Seinberg

[57] ABSTRACT

A filter, energized by a polyphase power source, is adapted to detect positive or negative sequence components present in the source. Means are provided for summing a first phase quantity with a second phase quantity which has been shifted by 180 electrical degrees. Additional means are utilized to phase shift the summed resultant itself by 120 electrical degrees and to sum the phase shifted resultant with the phase shifted second quantity and a third quantity. The second summation yields an output quantity proportional to only one of the sequence components, if any, present in the polyphase source.

24 Claims, 12 Drawing Figures

ACTIVE SYMMETRICAL COMPONENT SEQUENCE FILTER

BACKGROUND OF THE INVENTION

This invention relates to active symmetrical component sequence filter networks and, more particularly, to an economical filter network of such type. In the electrial art, especially that concerned with protective relaying, it is desirable in many instances to detect the presence and magnitude of the positive, negative and zero sequence components of a polyphase power source. Typical prior art filters for this purpose may be found in the following U.S. patents, namely: U.S. Pat. Nos. 2,854,632; 2,897,407; 3,154,737; 3,237,031; 3,699,441; and 3,736,470. Other types of sequence filters utilize sophisticated flux combining magnetic cores as is illustrated in U.S. Pat. No. 3,248,609. Unfortunately, most, if not all, of these prior art filters were overly complex, expensive or difficult to calibrate, requiring costly equipment for this purpose.

SUMMARY OF THE INVENTION

Accordingly, there is provided an extremely simple filter network which includes means for summing a first phasor quantity derived from a first phase of a polyphase power source with a second phasor quantity derived from a second phase of the polyphase power source and means for shifting this summed quantity by 60 electrical degrees. Additional means are provided for summing this 60° shifted resultant quantity with a third phasor quantity derived from a third phase of the polyphase source and with the same second phasor quantity to provide an output quantity which is proportional to and includes only one of the sequence components of the electrical power source or circuit being analyzed.

The phase shifting means is easily calibrated during manufacture of the filter or thereafter by supplying a phase sequence to the filter which includes the component to be filtered out of its output circuit and varying the resistive component of a capacitor-resistive phase shifting network of a first operational amplifier and the resistive component between the first and second operational amplifier to minimize the output quantity of the second amplifier as indicated by a simple instrument. If no desired sequence component is included, the output of the second operational amplifier, with the resistive components properly adjusted, will substantially approach zero. With this arrangement, there is no need to use an accurately calibrated, phase shifting sensing instrument to determine the degree of phase shifting.

DESCRIPTION OF THE PREFERRED EMBODIMENTS

Figure 1A:
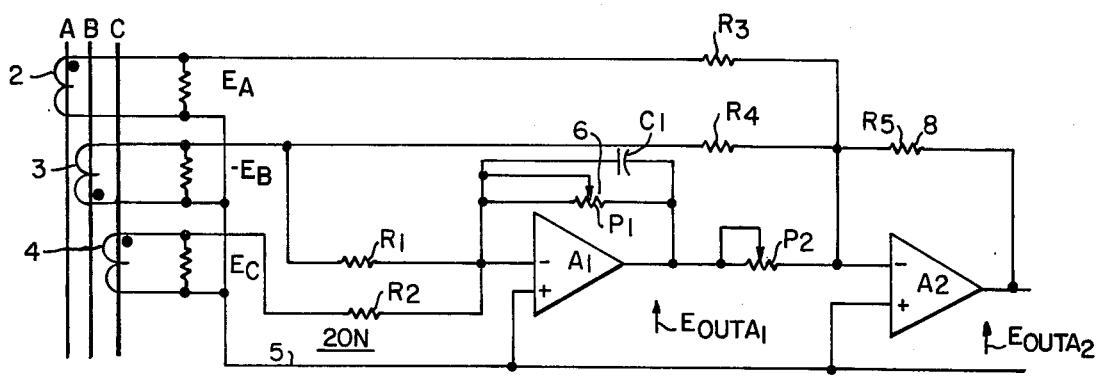
FIGS. 1A and 1B show schematically a negative-sequence and a positive-sequence current filter embodying the invention energized by a three phase, three wire power source.
Figure 1B:
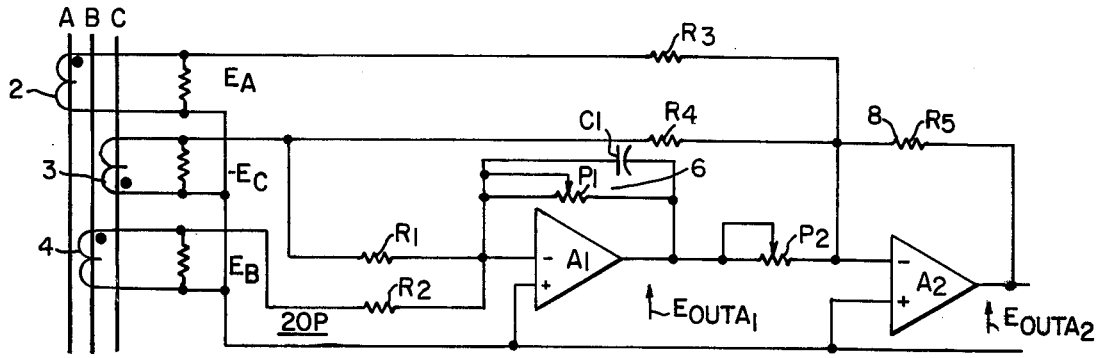

Referring to the drawings by characters of reference, the numerals 20N and 20P indicate generally a negative-sequence filter and a positive-sequence current filter respectively. The filter 20N is energized by the voltage quantities $E_A$, $E_B$ $E_C$ respectively from the associated phase conductors A, B and C through current transformers 2, 3 and 4 and the associated loading resistors. In the following discussion, a positive-sequence filter is one which provides an output quantity proportional to the positive-sequence of the polyphase power source with which it is associated, while a negative-sequence filter is one which provides an output quantity proportional to the negative-sequence of the polyphase power source with which it is asssociated.

The dotted terminal of transformr 3, associated with the phase conductor B, and the undotted terminals of the transformers 2 and 4, associated with the phase conductors A and C respectively, are connected to a common bus 5 which is connected, in turn, to the positive input terminals of a pair of operational amplifiers $A_1$ and $A_2$. The undotted terminal of transformer 3 and the dotted terminal of transformer 4 are connected to the negative input terminal of the amplifier $A_1$ through resistors $R_1$ and $R_2$, respectively. In this manner, the phasor quantities $+Q_C - Q_B$ (hereinafter Q will be used to indicate either a current or voltage quantity) are added together and supplied to the input of the amplifier $A_1$. The amplifier $A_1$ is provided with a phase shifting feedback circuit 6 connected between its output and its negative input terminal. The feedback circuit 6 includes a capacitor $C_1$ and a potentiometer $P_1$ and is arranged to provide a 60° electrical phase shift at the hertz of the three phase power source. The output quantity of the amplifier is therefore $Q_C - Q_B$, phase shifted to a leading angle of 120° or a lagging angle of 60°.

Figure 4:
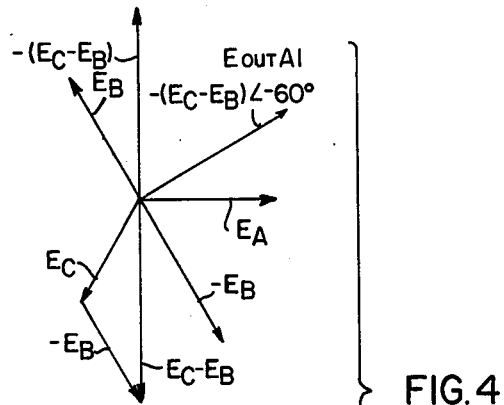
FIGS. 4, 5 and 6 are phasor diagrams of a negative-sequence current or voltage filter and illustrate that only the negative-sequence component of the three phase energizing source appears at its output terminals.
Figure 4:
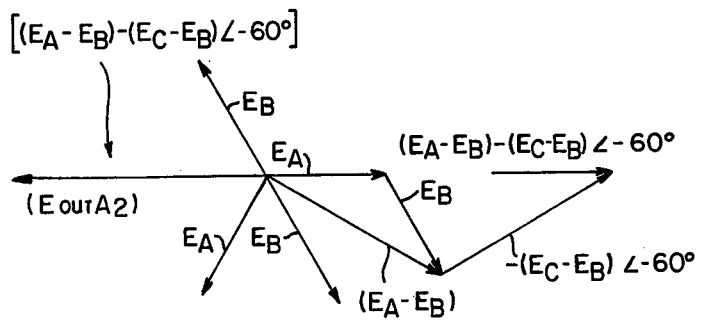
Figure 5:
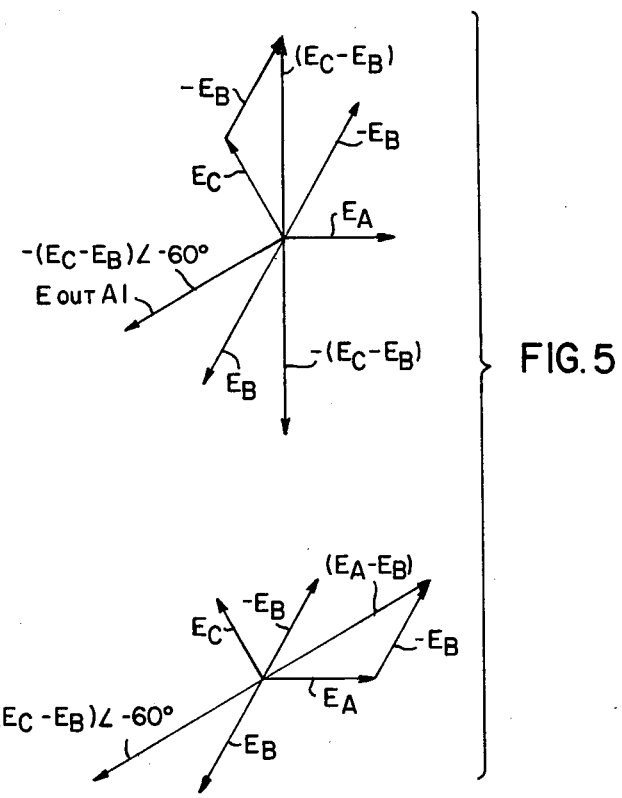
Figure 6:
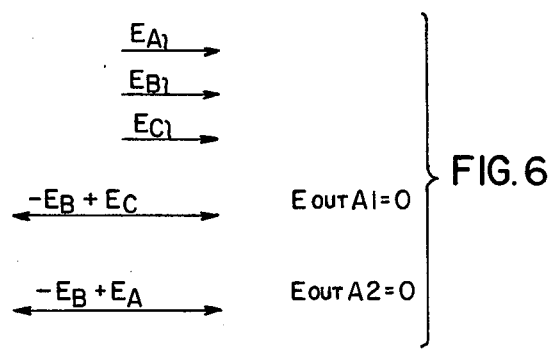

The dotted terminal of transformer 2 and the undotted terminal of transformer 3 are connected to the negative input terminal of amplifier $A_2$ through resistors $R_3$ and $R_4$. The output of the amplifier $A_1$ is also connected through a potentiometer $P_2$ to the negative input terminal of the amplifier $A_2$ whereby the quantity $(Q_A - Q_B)$ at its natural angle and the quantity $(Q_C - Q_B)$ at a 120° leading angle are supplied to the input of the amplifier $A_2$. The amplifier $A_2$ has a resistive feedback circuit 8 connecting its output to its negative input and, as shown by the correspondingly identified phasors in FIG. 4, provides an output quantity $(E_{out}A_2 = E_2)$, which is proportional in magnitude to the negative-sequence component of the polyphase power source as represented by the phase conductors A, B and C. No positive-or zero-sequence components will be contained in the output quantity of the amplifier as will be apparent from the phasor diagrams of FIGS. 5 and 6.

The filter 20P is similar to the filter 20N and like elements thereof will be designated by the same reference characters. The difference between the positive-sequence filter and the negative-sequence filter is in the input connections. In the negative-sequence filter 20N, the transformers 2, 3 and 4 were associated with the phases A, B and C, respectively, while the transformers 2, 3 and 4 of the filter 20P are associated with the phase conductors A, C and B, respectively. With this arrangement, the quantities $+Q_B$ and $-Q_C$ are summed and phase shifted to provide the quantity $(Q_B-Q_C)$ at a leading angle of 120°. This quantity is then summed with $Q_A$ and $-Q_C$ to provide an output quantity $E_2$ which is proportional to the positive-sequence component and which does not include any negative- or zero-sequence components.

Figure 2A:
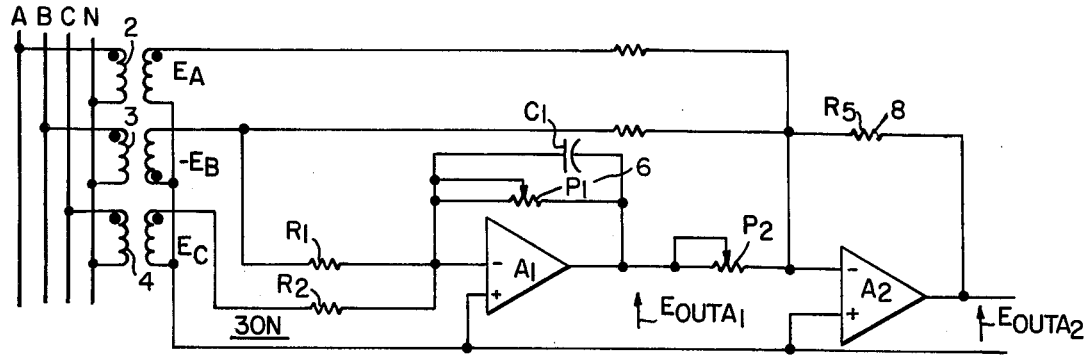
FIGS. 2A and 2B show schematically a negative-sequence and a positive-sequence voltage filter, energized by a four wire, three phase power source, embodying the invention.
Figure 2B:
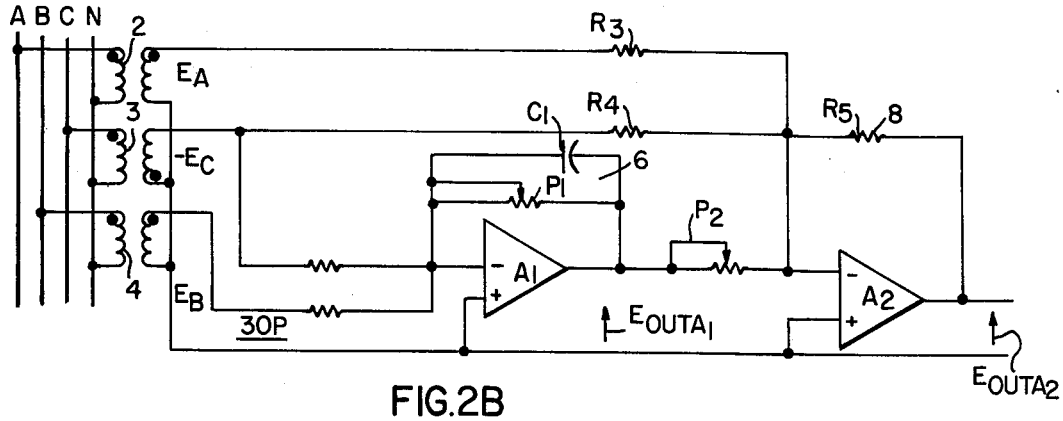

FIGS. 2A and 2B illustrate negative-sequence and positive-sequence voltage filters 30N and 30P for a four wire, three phase power source. In the network 30N, the transformers 2, 3 and 4 are connected between the neutral conductor N and the phase conductors A, B and C, respectively, and provide the quantities $Q_A$, $Q_B$ and $Q_C$. Its operation, as well as the operation of the filter 30P in which the transformers 2, 3 and 4 are connected between neutral and the phase conductors A, C and B and provide the quantities $Q_A$, $Q_C$ and $Q_B$ respectively, will be understood from the foregoing discussion of the filters 20N and 20P and, in the interest of brevity, further description is not believed to be necessary.

Figure 3A:
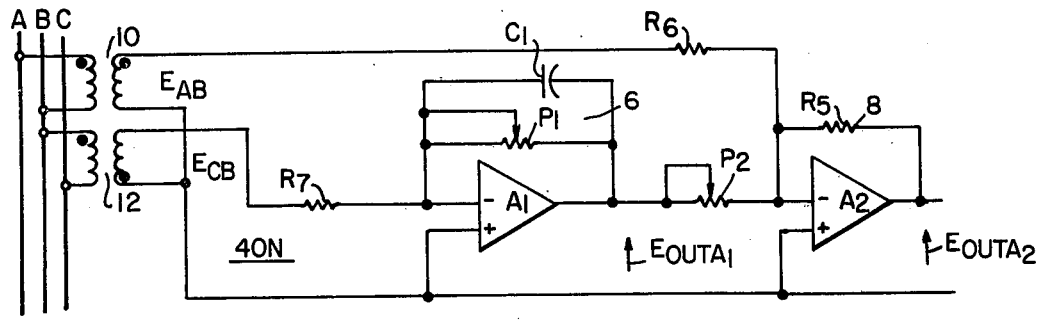
FIGS. 3A and 3B show schematically a negative-sequence and a positive-sequence voltage filter, energized by a three wire, three phase power source with no neutral, embodying the invention.
Figure 3B:
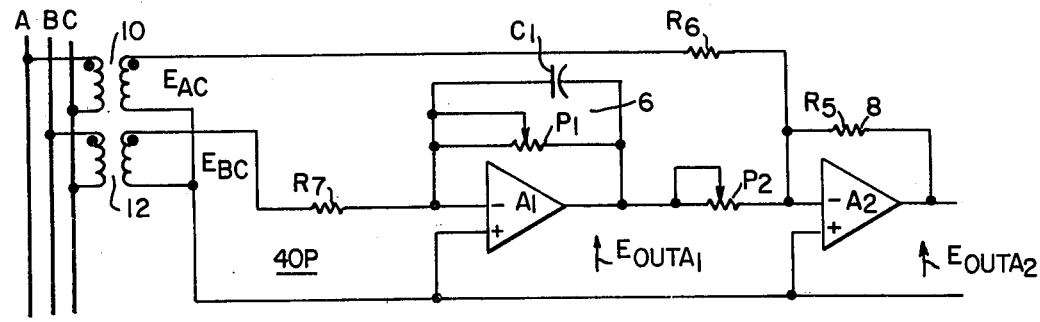
Figure 7:
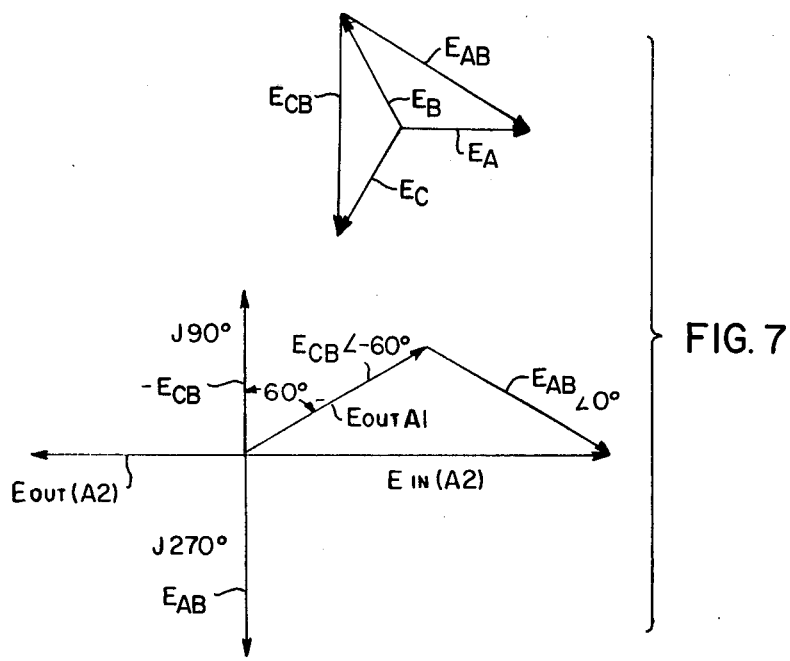
FIGS. 7, 8 and 9 are phasor diagrams of the negative-sequence filter shown in FIG. 3A and illustrate that only the negative-sequence component appears at its output terminals.
Figure 8:
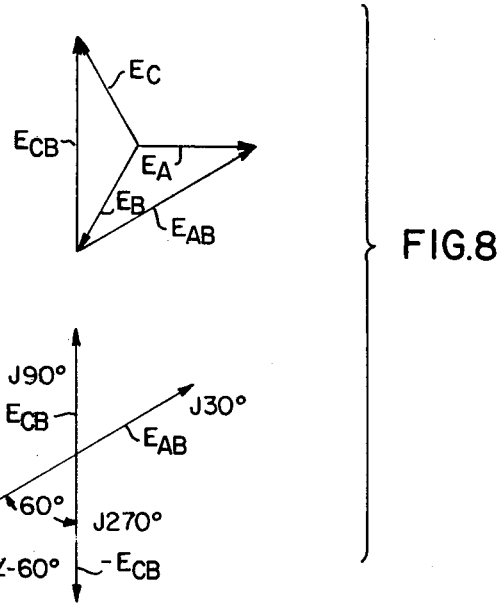
Figure 9:
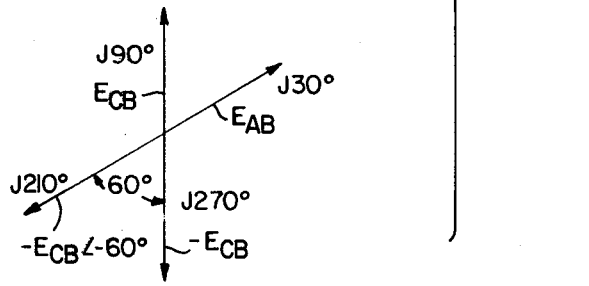

FIGS. 3A and 3B illustrate negative-sequence and positive-sequence voltage filters 40N and 40P for a three wire, three phase power source. The quantity $(Q_A-Q_B)$ in the filter 40N is derived by connecting a transformer 10 between the phase conductors A and B. The dotted terminal of its secondary winding is connected through a resistor $R_6$ to the negative input terminal of the amplifier $A_2$ and the undotted terminal is connected to the positive input terminal of the amplifiers $A_1$ and $A_2$. The quantity $(Q_C-Q_B)$ is derived by connecting a transformer 12 between the phase conductors B and C. The undotted terminals of the secondary winding of transformer 12 is connected through a resistor $R_7$ to the negative input terminal of the amplifier $A_1$ while its dotted terminal is connected to the positive input terminal of the amplifiers $A_1$ and $A_2$. The operation of the filter 40N will be apparent from the phasor diagram of FIGS. 7, 8 and 9.

The positive-sequence filter 40P differs from the filter 40N in that the transformer 10 thereof is connected between phase conductors A and C, while the transformer 12 is connected between the phase conductors B and C. It will be apparent that when so connected, the quantity $Q_B-Q_C$ is provided by the transformer 12 and the quantity $Q_A-Q_C$ is provided by the transformer 10. It should also be noted that the filters 30N, 30P, 40N and 40P also utilize, for the same purpose, the feedback circuits 6 and 8 described in connection with filters 20N and 20P.

What is claimed and is desired to be secured by United States Letters Patent is as follows:

1. A symmetrical component deriving network for a three-phase electrical system having phase conductors $a$, $b$ and $c$ with a phase rotation $a,b,c$, said network comprising first and second circuit means energized by first and second electrical quantities respectively, said quantities being derived from the quantities Q of said phase conductors, said first circuit means having a first phasor voltage output quantity which is the phasor quantity $Qc-Qb$ where $Qb$ and $Qc$ are the quantities Q of the phase conductors $b$ and $c$ respectively, said second circuit means having a second phasor voltage output quantity which is the phasor quantity $Qa-Qb$ where $Qa$ and $Qb$ are the quantities Q of the phase conductor $a$ and $b$ respectively, a phase shifting device having its input energized with said first phasor quantity and having an output circuit, said phase shifting device being effective to shift the phase of said first phasor quantity to provide third phasor quantity at an angle of $+120°$ with respect to said first phasor quantity, a summing network having first and second input circuits and an output circuit, said first input circuit of said summing network being energized by the third phasor quantity, said second input circuit of said summing network being energized by said second phasor quantity, said summing network having an output quantity proportional to the negative symmetrical component of said electrical system having the phase rotation $a,b,c$.

2. The network of claim 1 in which said phase shifting device is a first operational amplifier connected in an inverting manner and having a feedback circuit providing a phase shift of 60° to the feedback signal.

3. The network of claim 2 in which said summing network includes a second operational amplifier having a non-phase shifting feedback circuit.

4. The network of claim 2 in which said feedback circuit includes a capacitor and a first impedance device in shunt therewith.

5. The network of claim 4 in which the connection to one of said input circuits of said summing network includes a second impedance device.

6. The network of claim 5 in which said impedance devices are primarily resistive in nature and are arranged to have their resistance quantities adjustable.

7. A symmetrical component deriving network for a three-phase electrical system having phase conductors $a$, $b$ an $c$ with a phase rotation $a,b,c$, said network comprising first and second circuit means energized by first and second electrical quantities respectively, said quantities being derived from the quantities Q of said phase conductors, said first circuit means having a first phasor voltage output quantity which is the phasor quantity $Qb-Qc$ where $Qb$ and $Qc$ are the quantities Q of the phase conductors $b$ and $c$ respectively, said second circuit means having a second phasor voltage output quantity which is the phasor quantity $Qa-Qc$ where $Qa$ and $Qc$ are the quantities Q of the phase conductor $a$ and $c$ respectively, a phase shifting device having its input energized with said first phasor quantity and having an output circuit, said phase shifting device being effective to shift the phase of said first phasor quantity to provide third phasor quantity at an angle of $+120°$ with respect to said first phasor quantity, a summing network having first and second input circuits and an output circuit, said first input circuit of said summing network being energized by third phasor quantity, said second input circuit of said summing network being energized by said second phasor quantity, said summing network having an output quantity proportional to the positive symmetrical component of said electrical system having the phase rotation $a,b,c$.

8. The network of claim 7 in which said phase shifting device is a first operational amplifier connected in an inverting manner and having a feedback circuit providing a phase shift of 60° to the feedback signal.

9. The network of claim 8 in which said summing network includes a second operational amplifier having a non-phase shifting feedback circuit.

10. The network of claim 8 in which said feedback circuit includes a capacitor and a first impedance device in shunt therewith.

11. The network of claim 10 in which the connection to one of said input circuits of said summing network includes a second impedance device.

12. The network of claim 11 in which said impedance devices are primarily resistive in nature and are arranged to have their resistance quantities adjustable.

13. A symmetrical component sequence filter having first and second inputs supplying first and second input quantities which represent in phase and magnitude first and second operating conditions of a three-phase electrical system, first circuit means connected to said first input and energized by said first input quantity, said first circuit means having an output circuit, said first circuit means including phase shifting means operable to cause said output circuit to provide an output quantity which is proportional in magnitude to said first operating condition and phase shifted by 120° from said first input quantity, second circuit means connected to said second input and to said output circuit of said first circuit means for energization by said second input quantity and said output quantity, said second circuit means having an output circuit, said second circuit means including a summing device effective to combine said second input quantity with said output quantity of said first circuit means whereby said second circuit provided an output quantity at its said output circuit which is substantially solely only one of said negative and said positive and said zero sequence quantity of said electrical system.

14. The filter of claim 13 in which said second input quantity has a 60° phase angle with respect to said first input quantity.

15. A symmetrical component filter for deriving a voltage sequence component of a polyphase circuit having phases $a$, $b$ and $c$, said filter comprising three means deriving individual voltages V$a$, V$b$ and V$c$ which are proportional to the line to neutral voltages of phases $a$, $b$ and $c$ respectively, first and second operational amplifiers, each of said amplifiers having an input circuit and an output circuit, first circuit means connecting two of said voltages deriving means in parallel to said input circuit of said first amplifiers, a first feedback circuit connected between said output circuit and said input circuit of said first amplifier, said first feedback circuit including capacitive and resistive elements connected to provide a 60° phase shift at the hertz of said polyphase circuit, second circuit means connecting one of said two voltage deriving means and the other of said three voltage deriving means and said output circuit of said first amplifier to said input circuit of said second amplifier, and a second feedback circuit connected between said output and input circuits of said second amplifier.

16. The filter of claim 15 in which the polarity of said one of said two voltage deriving means is reversed in polarity to provide a voltage phasor which is phase shifted 180 electrical degrees from the phasor of the voltage of the phase from which it is derived.

17. The filter of claim 16 in which the phase sequence of the voltage of said phase is $a$, $b$ and $c$, said one of said two voltage deriving means is energized from the $b$ phase, and said other of said three voltage deriving means is energized from the $a$ phase.

18. A symmetrical component filter for deriving a sequence component of a polyphase electrical circuit having first, second and third phases, first and second adding networks, said first adding network being connected to be energized from said first and said second phases and to provide a first phasor quantity which is equal to the sum of one of the phasor quantities of said first and second phases phase shifted 180° a phase, a phase shifting network having its input energized by said first phasor quantity and effective to provide a second phasor quantity which is phase shifted 120 electrial degrees from said first phasor quantity, said second adding network being connected to be energized from said first and said third phases to provide a third phasor quantity which is equal to the sum of the phasor quantity of said third phase and said other phasor quantity phase shifted by 180 electrical degrees, said second adding network also being connected to be energized by said second phasor quantity, said second adding network having an output circuit energized by the phasor sum of said second phasor quantity and said third phasor quantity.

19. The filter of claim 18 in which said phase rotation of said phase is first, second and third, said one phasor quantity is the phasor quantity of said first phase and said other phasor quantity is the phasor quantity of said second phase.

20. The filter of claim 18 in said phase rotation of said phase is first, second and third, said one phasor quantity is the phasor quantity of said second phase and said other phasor quantity is the phasor quantity of said first phase.

21. A symmetrical component filter for deriving a current sequence component of a polyphase circuit having phases $a$, $b$ and $c$, said filter comprising three means deriving individual voltages V$a$, V$b$ and V$c$ which are proportional to the currents of phases $a$, $b$ and $c$ respectively, first and second operational amplifiers, each of said amplifiers having an input circuit and an output circuit, first circuit means connecting two of said voltage deriving means in parallel to said input circuit of said first amplifiers, a first feedback circuit connected between said output circuit and said input circuit of said first amplifier, said first feedback circuit including capacitive and resistive elements connected to provide a 60° phase lag at the hertz of said polyphase circuit, second circuit means connecting one of said two voltage deriving means and the other of said three voltage deriving means and said output circuit of said first amplifier to said input circuit of said second amplifier, and a second feedback circuit connected between said output and input circuits of said second amplifier.

22. The filter of claim 21 in which the polarity of said one of said two voltage deriving means is reversed in polarity to provide a current phasor which is phase shifted 180 electrical degrees from the phasor of the voltage of the phase from which it is derived.

23. The filter of claim 22 in which the phase sequence of the voltage of said phase is $a$, $b$ and $c$, said one of said two voltage deriving means is energized from the $b$ phase, and said other of said three voltage deriving means is energized from the phase.

24. The filter of claim 21 in which said capacitive and resistive elements of said first feedback circuit are connected in parallel, said first circuit means includes first and second resistors individually connected, said two of said voltage deriving means to said input circuit of said first amplifier, said second circuit means includes third and fourth resistors individually connecting said one of said two voltage deriving means to said input circuit of said second amplifier, said second circuit means further includes a fifth resistor connecting said output circuit of said first amplifier to said input circuit of said second amplifier.

* * * * *